United States Patent [19]

Sakamoto

[11] 4,314,617
[45] Feb. 9, 1982

[54] STEERING APPARATUS FOR A HYDRAULICALLY DRIVEN VEHICLE

[75] Inventor: Masaaki Sakamoto, Kaga, Japan

[73] Assignee: Kabushiki Kaisha Komatsu Seisakusho, Tokyo, Japan

[21] Appl. No.: 153,593

[22] Filed: May 27, 1980

[30] Foreign Application Priority Data

May 25, 1979 [JP] Japan ............................ 54/69422[U]

[51] Int. Cl.³ .............................................. B62D 11/04
[52] U.S. Cl. ..................................... 180/6.48; 74/476; 180/6.66
[58] Field of Search ........................ 180/6.2, 6.48, 6.5, 180/6.66, 315; 74/476, 477

[56] References Cited

U.S. PATENT DOCUMENTS

| | | | |
|---|---|---|---|
| 3,648,537 | 3/1972 | Burrell | 74/477 |
| 3,792,744 | 2/1974 | Gray | 180/6.48 |
| 3,876,021 | 4/1975 | Baumgartner | 180/6.48 |
| 4,067,423 | 1/1978 | Schneider | 74/476 |

Primary Examiner—Joseph F. Peters, Jr.
Assistant Examiner—Randall A. Schrecengost
Attorney, Agent, or Firm—Armstrong, Nikaido, Marmelstein & Kubovcik

[57] ABSTRACT

A steering apparatus for a hydraulically driven vehicle having a pair of independent hydrostatic transmissions, comprising a pair of steering levers mounted for movement to a dashboard of the vehicle, a pair of swivel levers pivotally mounted on the dashboard each being pivotally connected to the respective steering levers, a pair of steering valves each for controlling the respective hydrostatic transmissions so that each hydrostatic transmission has forward and reverse positions and a stop position therebetween, a pair of linkages each for operatively interconnecting the respective swivel levers and the steering valves, and a seesaw member pivotally mounted at an intermediate portion thereof on the dashboard for preventing the pair of swivel levers from being simultaneously pivoted to such a degree that both of the steering valves are changed over to their reverse running position.

2 Claims, 3 Drawing Figures

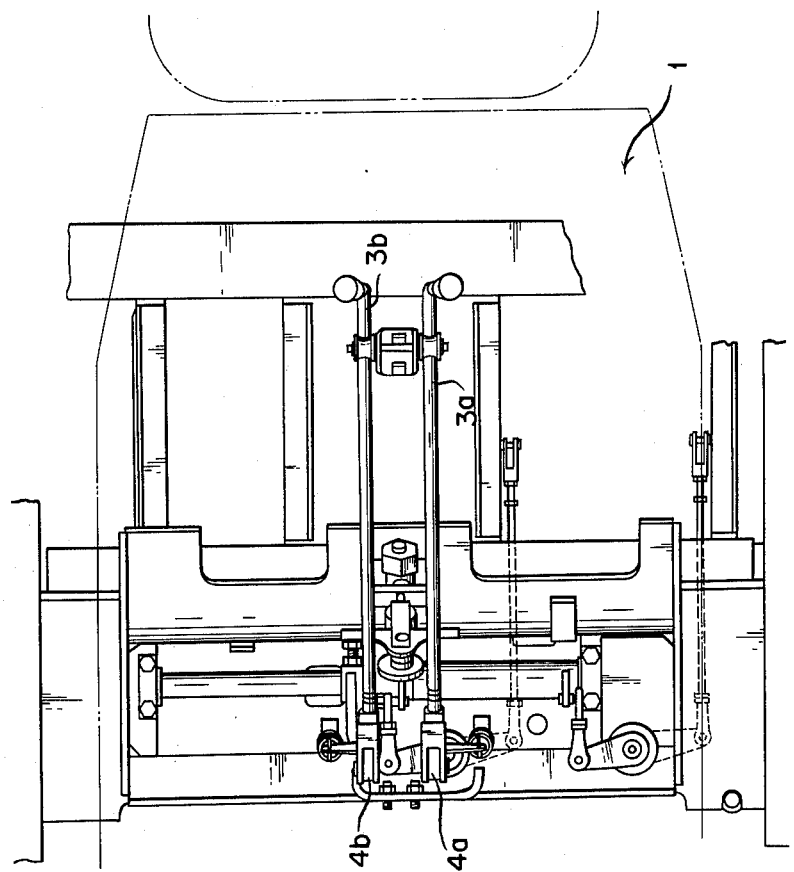

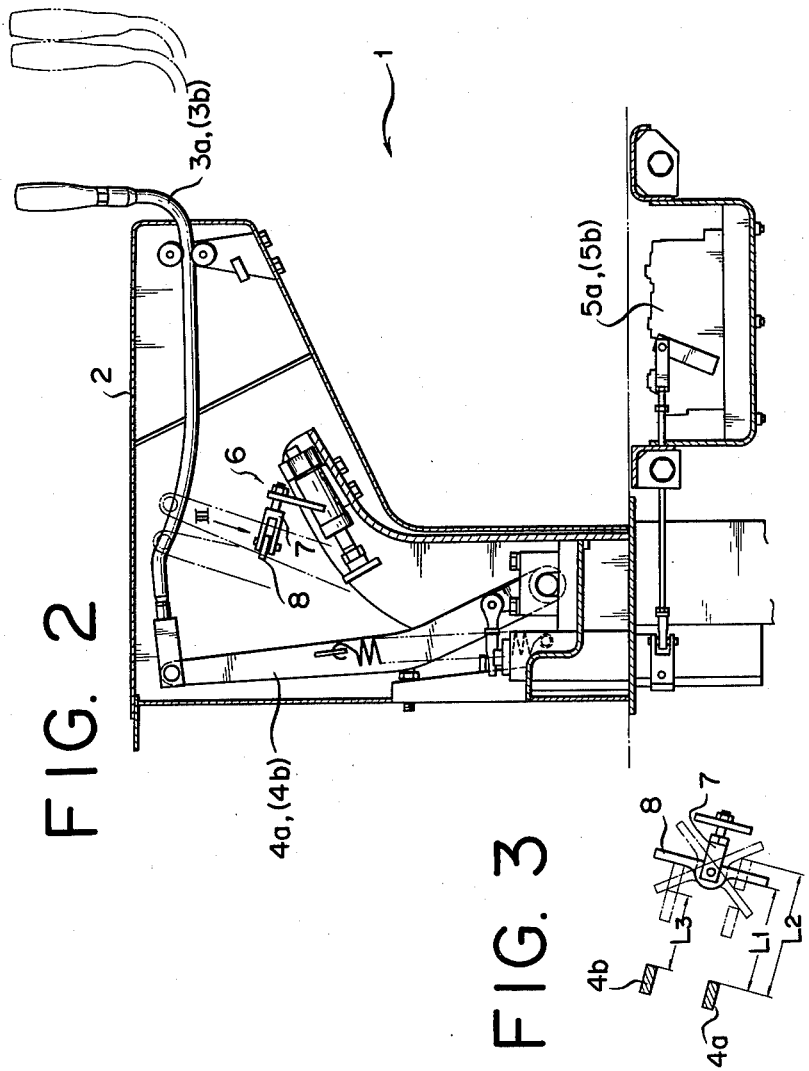

STEERING APPARATUS FOR A HYDRAULICALLY DRIVEN VEHICLE

BACKGROUND OF THE INVENTION

This invention relates to a steering gear of hydraulically driven vehicles having a pair of independently driven hydrostatic transmissions.

Steering of the hydraulically driven vehicles is made by controlling or manipulating a pair of hydrostatic transmission systems which drive the left and right side running gears to forward drive, deceleration, stopping and backward drive positions by the left and right side steering members, respectively.

For example, if one of the left and right side steering members is operated to stop one of the pair of hydrostatic transmission systems, the other hydrostatic transmission system is still rendered operative so that the vehicle can turn slowly or make a pivot turn. If the above-mentioned one of the steering members is operated further, said one of the hydrostatic transmission systems is shifted from stopping position to backward drive position so that the vehicle can turn quickly or make a spin turn.

Such steering operation system is, however, disadvantageous in that, while one of the hydrostatic transmission systems is under backward drive control, there is a possibility that the other hydrostatic transmission system is manipulated by the driver by mistake to backward drive position so as to cause an unexpected backward drive of the vehicle.

SUMMARY OF THE INVENTION

It is therefore an object of the present invention to provide a steering apparatus for a hydraulically driven vehicle which can overcome the above noted problems by providing a simple means.

Another object of the present invention is to provide a steering apparatus for a hydraulically driven vehicle which can significantly enhance the safety of the vehicle at the turning operation by preventing the vehicle from being put in an accidental reverse running condition during the turning operation.

In accordance with an aspect of the present invention, there is provided a steering apparatus for a hydraulically driven vehicle having a pair of independent hydrostatic transmissions, comprising: a frame of the vehicle; a pair of steering levers mounted for movement to said frame; a pair of swivel levers pivotally mounted on said frame each being pivotally connected to said respective steering levers; a pair of steering valve means each for controlling said respective hydrostatic transmissions so that each hydrostatic transmission has forward and reverse positions and a stop position therebetween; a pair of linkages each for operatively interconnecting said respective swivel levers and said steering valve means; and means mounted on said frame for preventing said pair of swivel levers from being simultaneously pivoted to such a degree that both of said steering valve means are changed over to their reverse running positions.

The above and other objects, features and advantages of the present invention will be readily apparent from the following description taken in conjunction with the accompanying drawings.

BRIEF DESCRIPTION OF THE DRAWINGS

FIG. 1 is a plan view of a steering apparatus according to the present invention with a dashboard being omitted;

FIG. 2 is a cross-sectional side elevation of a steering apparatus of the present invention; and FIG. 3 is a view as seen from an arrow III in FIG. 2.

DESCRIPTION OF THE PREFERRED EMBODIMENT

The present invention will now be described below by way of example only with reference to the accompanying drawings.

In the drawings, reference numeral 1 denotes a driver's seat for crawler tractors such as bulldozers etc., 2 a dashboard, and 3a and 3b steering levers for turning the vehicle leftwards or rightwards. The steering levers 3a and 3b are connected through swivel levers 4a and 4b and linkages to steering control valves 5a and 5b, respectively, which are independently mounted on the left and right sides. The arrangement is made such that by turning the swivel levers 4a and 4b through the steering levers 3a and 3b, the steering control valves 5a and 5b can occupy any of their forward drive, deceleration, stopping and backward drive positions depending on the extent of the swivelling or turning.

Reference numeral 6 denotes stroke regulator means mounted opposite to the direction of turning of the swivel levers 4a and 4b from the forward drive condition to the backward drive condition.

The stroke regulator means 6 is provided with a seesaw member 8 which is pivotally mounted on a yoke member 7 having an intermediate portion thereof fixedly secured to the dashboard side. The seesaw member 8 is arranged such that when both the swivel levers 4a and 4b are turned from the forward drive position through the decelerating position to the stopping position over a stroke of $L_1$, the swivel levers 4a and 4b are allowed to abut against the seesaw member 8 simultaneously thereby enabling the balance on the left and right sides to be obtained, and when the swivel lever 4a is turned to its backward drive position over a stroke of $L_2$, the other swivel lever 4b is turned only up to the stopping position over a stroke of $L_3$ so as to abut against the seesaw member 8 so that the lever 4b cannot be turned further thereby regulating the stroke of the lever 4b.

In the above-mentioned arrangement, if the steering levers 3a and 3b on the left and right sides are pulled at the same time, both the swivel levers 4a and 4b connected thereto, respectively, will turn to their stopping positions over a stroke of $L_1$ so as to abut against the seesaw member 8 simultaneously thereby to regulate further strokes or movements of the swivel levers thus stopping the vehicle. If only the steering lever 3a is pulled to its full extent so as to turn the swivel lever 4a over a stroke of $L_2$ to its backward drive position, the seesaw member 8 is also turned thereby, and as a result, the other swivel lever 4b can turn only over the stroke of $L_3$ and occupy its decelerating or stopping position.

As mentioned in detail hereinabove, according to the present invention, in the steering gear of hydraulically driven vehicles wherein the left and right side running gears are driven by independent hydrostatic transmission systems, respectively, and the steering control valves 5a and 5b controlling respective hydrostatic transmission systems can be shifted independently to any of their forward drive, decelerating, stopping and backward drive positions by manipulating the left and right side steering members which comprise the steering levers 3a and 3b, swivel levers 4a and 4b and linkages, the seesaw member 8 is pivotally mounted on the framework and the left and right side steering members can abut against the seesaw member 8 simultaneously under their stopping conditions in the course of their movements from the forward drive position to the stopping position thereby enabling the balance on the left and right sides to be obtained. Therefore, the vehicle can be stopped by shifting the pair of steering members at the same time, however, when one of the steering members is put under backward drive condition, the other steering member can be turned only to its decelerating position or stopping position by the action of the seesaw member 8 so that possible occurrence of unexpected or sudden backward drive of the vehicle caused by wrong operations of the steering members by the driver at the time of quick turning or spin turning can be prevented thereby enabling the safe operation at the time of turning of the vehicle to be achieved.

It is to be understood that the foregoing description is merely illustrative of a preferred embodiment of the present invention, and that the scope of the invention is not to be limited thereto, but is to be determined by the scope of the appended claims.

What I claim is:

1. A steering apparatus for a hydraulically driven vehicle having a pair of independent hydrostatic transmissions, comprising:
   a frame of the vehicle;
   a pair of steering levers mounted for movement to said frame;
   a pair of swivel levers pivotally mounted on said frame each being pivotally connected to said respective steering levers;
   a pair of steering valve means each for controlling said respective hydrostatic transmissions so that each hydrostatic transmission has forward and reverse positions and a stop position therebetween;
   a pair of linkages each for operatively interconnecting said respective swivel levers and said steering valve means; and
   means mounted on said frame for preventing said pair of swivel levers from being simultaneously pivoted to such a degree that both of said steering valve means are changed over to their reverse running positions.

2. A steering apparatus for a hydraulically driven vehicle as recited in claim 1 wherein said last mentioned means comprises a seesaw member pivoted at an intermediate portion thereof, said seesaw member being positioned to collide with both of said swivel levers when both of said steering levers are simultaneously operated to change over both of said steering valve means to their stop positions.

* * * * *